US007647037B2

(12) United States Patent
Ayachitula et al.

(10) Patent No.: US 7,647,037 B2
(45) Date of Patent: Jan. 12, 2010

(54) LOCATION AWARE, ON DEMAND, MEDIA DELIVERY TO REMOTE DEVICES

(75) Inventors: Naga A. Ayachitula, Elmsford, NY (US); Andrew J. Bradfield, Cortlandt Manor, NY (US); Shu-Ping Chang, Shrub Oak, NY (US); James S. Lipscomb, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/344,059

(22) Filed: Jan. 31, 2006

(65) Prior Publication Data

US 2007/0177558 A1      Aug. 2, 2007

(51) Int. Cl.
 *H04W 4/00*      (2009.01)
(52) U.S. Cl. .................. 455/414.1; 455/405; 455/407
(58) Field of Classification Search .............. None
 See application file for complete search history.

(56) References Cited

U.S. PATENT DOCUMENTS

| | | | |
|---|---|---|---|
| 5,105,423 A | 4/1992 | Tanaka et al. ............. 371/5.5 |
| 5,825,761 A | 10/1998 | Tanaka et al. ............. 370/333 |
| 5,914,959 A | 6/1999 | Marchetto et al. .......... 370/468 |
| 6,181,686 B1 | 1/2001 | Hamalainen et al. ........ 370/347 |
| 6,240,094 B1 | 5/2001 | Schneider .................. 370/412 |
| 6,539,205 B1 | 3/2003 | Wan et al. .................. 455/67.1 |
| 6,889,257 B1* | 5/2005 | Patel ......................... 709/232 |
| 7,492,770 B2* | 2/2009 | Senthilnathan et al. ...... 370/394 |
| 2001/0055332 A1 | 12/2001 | Sadjadpour et al. |
| 2002/0146074 A1* | 10/2002 | Ariel et al. ............. 375/240.27 |
| 2003/0040272 A1* | 2/2003 | Lelievre et al. ............ 455/3.06 |
| 2003/0052911 A1* | 3/2003 | Cohen-solal ................ 345/738 |
| 2006/0109915 A1* | 5/2006 | Unger .................. 375/240.27 |

\* cited by examiner

*Primary Examiner*—Charles N Appiah
*Assistant Examiner*—Jaime M Holliday
(74) *Attorney, Agent, or Firm*—Joseph E. Bracken; A. Bruce Clay

(57) ABSTRACT

A method, system and computer program and method for delivering a streaming data to a remote device from a wireless transmitter. In one embodiment, a transmitter is configured to send units of the streaming data to the remote device. A receiver is configured to receive usage data about the streaming data from the remote device. An adjusting module is configured to automatically adjust a transmission strategy of unsent units of the streaming data based, at least in part, on the usage data as a function of time according to a transmission policy. The usage data may include at least location information about the remote device or time of day information at the remote device. A user interface at the remote device may be configured to adjust the predefined transmission policy.

15 Claims, 5 Drawing Sheets

US 7,647,037 B2

LOCATION AWARE, ON DEMAND, MEDIA DELIVERY TO REMOTE DEVICES

FIELD OF THE INVENTION

The present invention relates generally to computer networks, and more specifically to techniques for wireless delivery of streaming data, such as media presentations, to remote devices.

BACKGROUND

Wireless transmission of media presentations, such as movies, music and photos, is generally more costly than transmission using conventional wired connections. Nevertheless, there appears to be little capability in the conventional art to help users manage the costs of media presentation transmission to remote devices.

Furthermore, mobile video devices, such as cellular phones, Personal Digital Assistants (PDAs), wireless laptops and tablets, etc., receive dramatically varying signal qualities as the receiver moves about. When reception is poor a streaming media presentation may appear jerky, resolution may decrease, and artifacts may be introduced that detract from the user's enjoyment of the media presentation. For example, when signal quality degrades, large black areas may be seen moving around a video display. The conventional art, however, has failed to adequately provide remote device with user control over a transmission strategy in response to variations in signal quality.

SUMMARY OF THE INVENTION

One exemplary aspect of the present invention is a method for delivering a streaming data to a remote device from a wireless transmitter. The method includes a sending operation for sending a first portion of the streaming data to the remote device using a transmission strategy. A receiving operation is configured to receive usage data from the remote device. The method then adjusts the transmission strategy based, at least in part, on the usage data according to a transmission policy. A second sending operation sends a second portion of the streaming data to the remote device according to the adjusted transmission strategy.

The usage data may include at least location information about the remote device or time of day information at the remote device. The usage data may also include signal reception quality data about the first portion of the streaming data. The method may further include steps of providing a user interface at the remote device for adjusting the transmission policy and receiving the transmission policy from the remote device. It is further contemplated that automatically adjusting the transmission strategy includes adjusting a number of error-correction bits transmitted along with the streaming media presentation, adjusting an uninterrupted portion length of the streaming media presentation sent to the remote device (data cached or pre-buffered onto the device for later use), and/or pre-buffering additional transmitters proximate the remote device, where it is at the given time and where it is predicted to be based on current usage data and historical usage data, with the streaming data.

Another exemplary aspect of the present invention is a system for delivering a media data to a remote device from a wireless transmitter. The system includes a transmitter configured to send units of the media data to the remote device. A receiver is configured to receive usage data about the media data from the remote device. An adjusting module is configured to automatically adjust a transmission strategy of unsent units of the media data based, at least in part, on the usage data as a function of time according to a transmission policy.

Yet another exemplary aspect of the present invention is a computer program product with computer readable program codes for delivering a streaming data to a remote device from a wireless transmitter. The computer readable program codes are configured to cause the program to send a first portion of the streaming data to the remote device using a transmission strategy, receive usage data from the remote device, automatically adjust the transmission strategy based, at least in part, on the usage data according to a transmission policy, and send a second portion of the streaming data to the remote device according to the adjusted transmission strategy.

A further exemplary aspect of the present invention is a remote device suitable for presenting streaming data. The remote device includes a receiving unit configured to receive the streaming data. A characterizing unit is configured to characterize a transmission strategy. A user interface, coupled to the characterizing unit, is configured to enable a user of the remote device to specify the transmission policy while the receiving unit is receiving the streaming data.

DETAILED DESCRIPTION OF THE INVENTION

Figure 1:
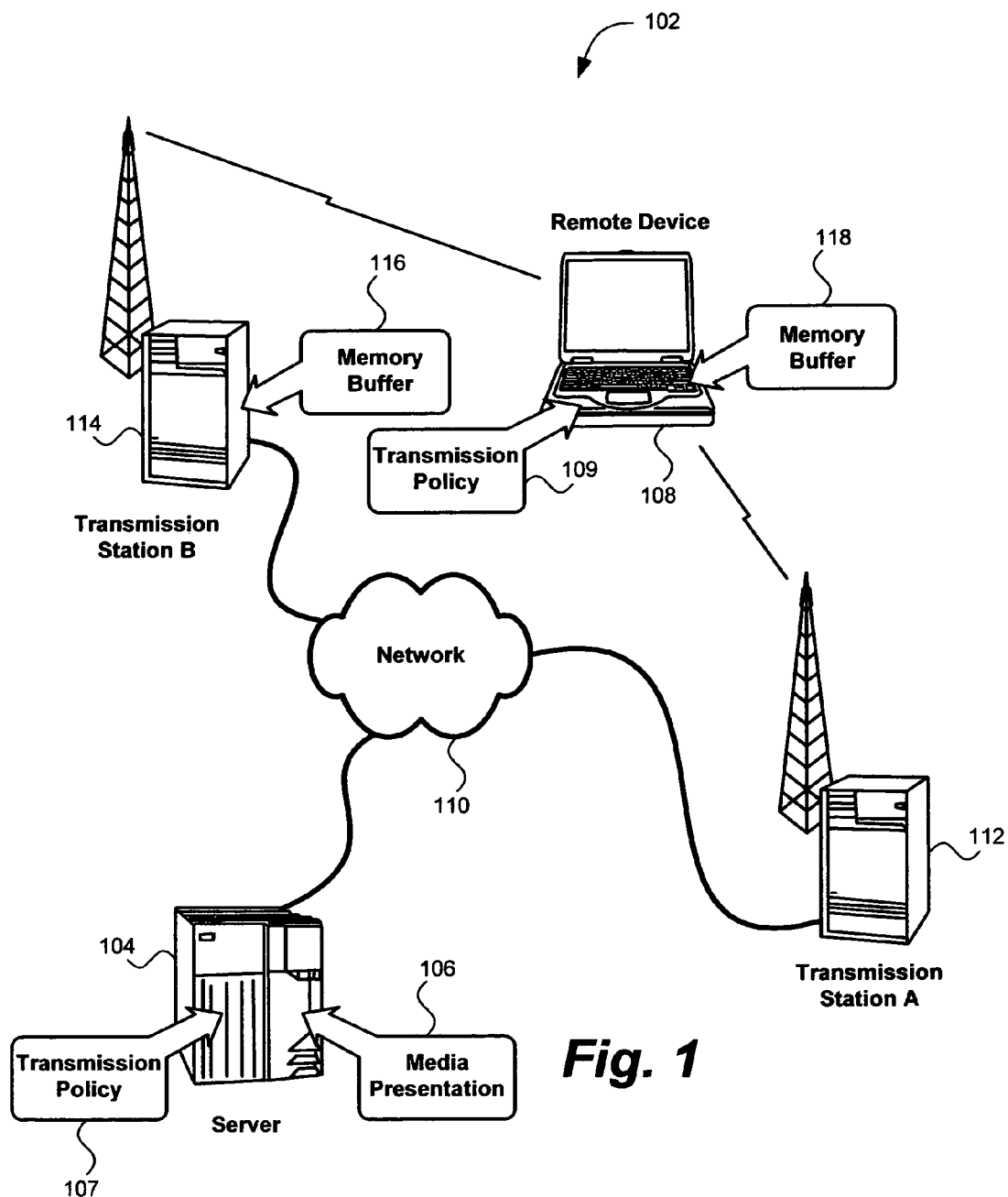
FIG. 1 shows one configuration of an exemplary environment embodying the present invention.

The subject of the present invention relates to the delivery of media presentations to remote devices in a customizable and economical manner. Throughout the description of the invention reference is made to FIGS. 1-5. When referring to the figures, like structures and elements shown throughout are indicated with like reference numerals.

FIG. 1 shows an exemplary environment 102 wherein the present invention may be used. It should be noted the environment 102 is presented for illustration purposes only and is representative of countless configurations in which the invention may be implemented. Thus, the present invention should not be considered limited to the system configuration shown in the figure. The environment 102 includes a server 104 configured to deliver a media presentation 106 to a remote device 108 via a computer network 110. As shown, the remote device 108 receives the media presentation 106 wirelessly through at least one data transmitter 112.

The media presentation 106 may be streaming media. As used herein, streaming media (also referred to herein as "streaming data") is data that is presented to the user while it is being transmitted. The streaming media may be temporarily buffered in the remote device's memory to help cushion the effects of abrupt changes in the media presentation's transmission rate because of, for example, reduced signal strength or a signal outage. The media presentation 106 may include, but is not limited to, audio, visual, text and binary data. Applications executing at the remote device 108 are utilized to present the media presentation to the device user.

The server 104 may also store a transmission policy 107. As described in detail below, the transmission policy 107 includes media presentation delivery rules customized to the preferences of the remote device user. Transmission policy may indicate, for example, the remote device user's preferred balance of media presentation quality and transmission cost. The transmission policy may also describe, among other things, whether simultaneous transmissions of the media presentation are allowed, the amount of presentation caching available, and historical usage data of the remote device. The transmission policy is adjustable at the remote device 108 via a user interface. Thus, a copy of the transmission policy 107 stored at the remote device 108 is accessible to the server 104 through the computer network 110.

The computer network 110 may include a combination of wired and wireless connections. Wireless communications within the network 110 may utilize, for example, audio, radio and/or optical carrier frequencies. The computer network 110 may be a Local Area Network (LAN), a Wide Area Network (WAN), a piconet, or a combination thereof. It is contemplated that the computer network 110 may be configured as a public network, such as the Internet, and/or a private network, such as an Intranet or other proprietary communication system. Various topologies and protocols known to those skilled in the art may be exploited by the network 110, such as WiFi, Bluetooth(R), TCP/IP, UDP, GSM, and CDMA. Furthermore, the computer network 110 may include various networking devices known in the art, such as routers, switches, bridges, repeaters, etc.

As is described in detail below, the present invention beneficially enables automatic control over a multimedia presentation's future transmission strategy by examining a remote device's current usage data. As used herein, usage data is defined as feedback from the remote device that includes at least location data or time of day data. Usage data may include additional information, such as signal strength, error frequency, packet acknowledgement, device identification, etc. In one configuration of the invention, usage data is sent from the remote device 108 to the server 104. In response, the server 104 automatically adjusts the transmission strategy of the multimedia presentation 106 according to the transmission policy 107 when necessary.

For example, usage data from the remote device 108 may indicate the remote device 108 will soon be moving from a geographic region serviced by transmission station A 112 to a geographic region serviced by transmission station B 114. With this information, the server 104 may instruct transmission station B 114 to preload its memory buffer 116 with the media presentation 106 in order to avoid interruption of the presentation during the anticipated transmission station handoff. Thus, when reception is poor, the server 104 may change the current transmission strategy and trade robustness for other presentation qualities so that, for instance, poor media artifacts are few and occur less frequently in exchange for degraded presentation resolution or a smaller presentation size. Such modifications of the presentation may be more pleasant for the user to see and/or hear.

It is contemplated that the usage data from the remote device 108 may provide an assortment of information to the server 104. For example, the usage data may include a position and time of the device 108. With such information, the server 104 can calculate the remote device's velocity and direction. Alternatively, the usage data may include historical usage patterns that may predict the user's movements over time. The historical usage patterns may pertain to the behavior of the particular remote device 108 receiving the media presentation 106, or to the general behavior of other remote devices proximate in location and time of day.

In addition to loading a transmission station's memory buffer 116 in anticipation of a transmitter handoff, other transmission strategies are contemplated by the present invention. One transmission strategy contemplated includes instructing the remote device's memory buffer 118 to cache more or less of the media presentation 106 in response to the usage data. For example, the memory buffer 118 may increase the amount of media presentation cached when the usage data indicates a pending communication loss between the remote device 108 and its transmission station 112. Another transmission strategy may include increasing or decreasing the number of transmission stations simultaneously communicating with the remote device 108. Further transmission strategies contemplated by the present invention include adjusting the number error-correcting bits in the transmission signal to the remote device 108, reshuffling the bit order of the transmission to the remote device 108, and/or changing the data transmission rate of the transmitted signal. Additional transmission strategies may be implemented in accordance with the present invention, as described below.

In a particular embodiment of the invention, the transmission policy 107 is controlled by the remote device's user, based on his or her preferences. Specifically, a user interface may be provided at the remote device 108 allowing its user to specify the quality verses price tradeoff desired during transmission. Thus, the user interface, for example, may allow the user to indicate that once the data quality of the media presentation falls below an acceptable threshold, additional bandwidth will be purchased by the user. This scenario may occur if the quality of the media presentation is very important to the user's enjoyment of the presentation. Conversely, the user may indicate that if the data quality increases above a ceiling threshold, less bandwidth is desired. This scenario may occur when the remote device's hardware is not designed to display the media presentation in high quality (such as a small cellular phone display), and a resolution beyond the device's capabilities does not enhance the presentation. Thus, there may be are many reasons for a user to desire an economical or moderate bandwidth. Embodiments of the present invention allow remote devices that are not as advanced or miniaturized to receive low resolution video and still participate in the media presentation without having to process or pay for extra information that cannot be effectively presented to the user.

Figure 2:
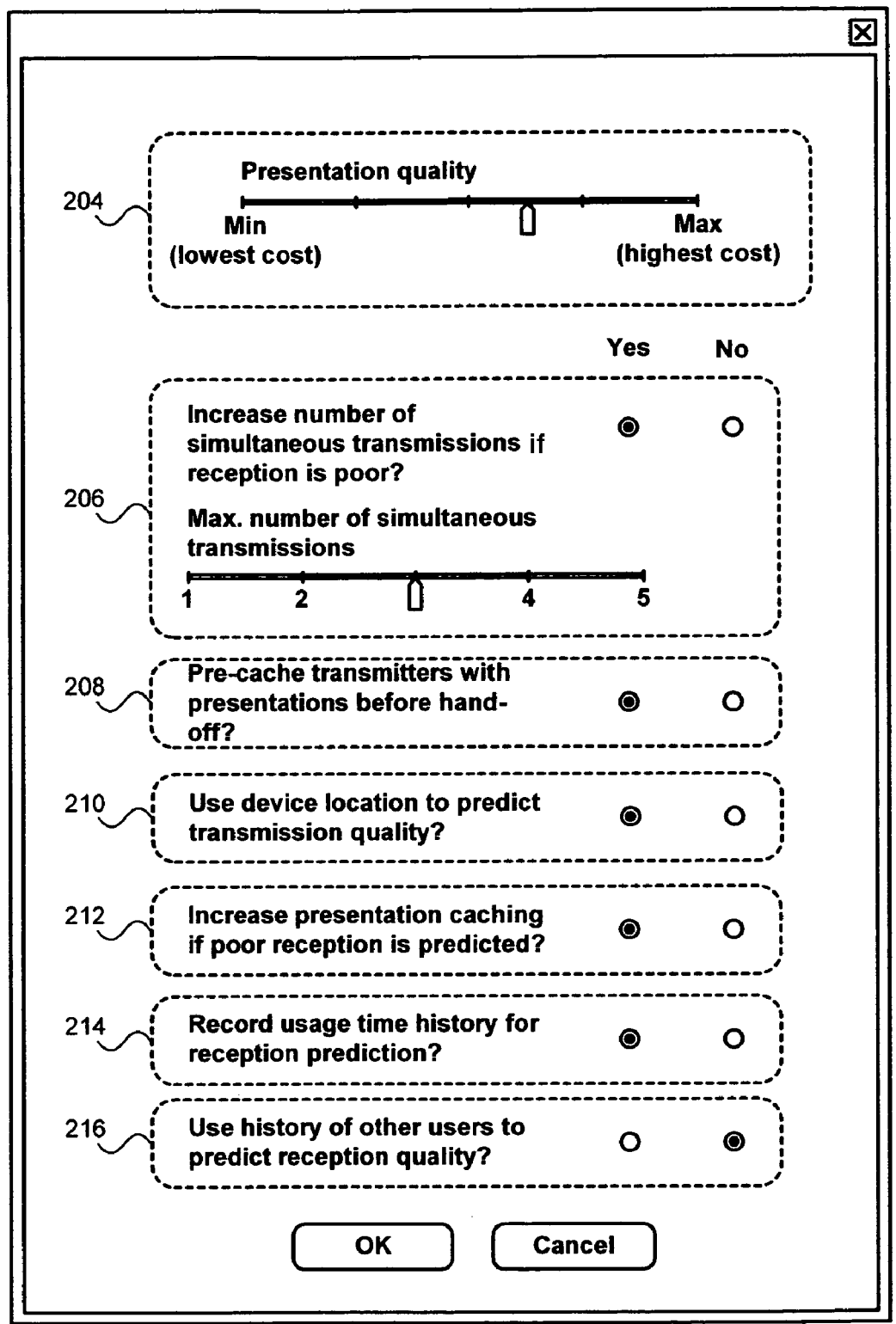
FIG. 2 shows exemplary dialog box at the remote device for specifying various transmission policies.

Turning to FIG. 2, an exemplary dialog box 202 at the remote device for specifying various transmission policies is shown. It is contemplated that the dialog box 202 may be constructed using a choice of technologies known to those skilled in the art. For example, the dialog box 202 may be created using different user interface toolkits and languages, such as Swing, AWT (Abstract Windowing Toolkit), XUL (XML User-interface Language), and various operating system APIs (Application Programming Interfaces). In addition, the dialog box 202 may be invoked any time during transmission of the media presentation, thus enabling the user to dynamically modify a transmission policy and receive instant feedback.

Section 204 of the dialog box 202 includes a slide bar allowing the user to select the desired balance of data quality and cost. As mentioned above, the quality of a media presentation is often in direct relation to the bandwidth used to transmit the presentation; the more bandwidth used, the greater the presentation quality. Greater bandwidth, however, generally costs more money. Hence, section 204 permits the user to specify a preferred cost to quality balance. Among the factors affecting this preference may be the user's budget, the importance placed on the media presentation, and the remote device's performance capabilities. Setting a transmission policy based on the user's preferences for an appropriate quality/price tradeoff can help establish a desirable price for the presentation.

Section 206 of the dialog box 202 includes Yes/No radio buttons and a slide bar to enable simultaneous transmissions of the media presentation to the remote device. It is contemplated that a media presentation transmission policy may include increases to the number of transmission stations broadcasting to the remote device when the presentation quality drops below an acceptable level. Consequently, the remote device could select the strongest transmission signal and hopefully improve the presentation quality. Thus, section 206 allows the user to activate this transmission strategy feature and control its utilization.

Section 208 of the dialog box 202 includes Yes/No radio buttons to enable pre-caching of transmitters before a predicted transmitter hand-off. This transmission policy feature leverages prediction information about the next transmitter station switch. For example, if a media server is aware that a remote device is being used on a train with a predetermined travel path and schedule, transmission stations along the travel path may be cached with the media presentation. Pre-caching transmitters with the media presentation can help prevent an interruption of the presentation when the handoff does occur.

Section 210 of the dialog box 202 includes Yes/No radio buttons to enable location awareness of the remote device for transmission quality prediction. This transmission policy uses the remote device's location to adjust the media presentation transmission. For example, if a media server is aware that a remote device is traveling to an area where poor transmission reception is expected, the server may proactively respond in a manner that helps maintain the current presentation quality, such as pre-caching on the remote device or increasing error correction bits. Thus, as used herein, a location aware strategy examines the physical position and direction of a remote device and predicts the future reception of the remote device based on the past history of the remote device or similar devices.

Section 212 of the dialog box 202 enables the user to increase memory caching at the remote device if poor reception is predicted. This transmission policy feature involves sending more of the media presentation to the remote device in anticipation of poorer transmission conditions in the near future. In other words, the remote device can automatically adjust the quantity of local memory dedicated to temporarily store the media presentation in anticipation of future transmission conditions.

Section 214 of the dialog box 202 asks the user for permission to record usage time history in order to predict reception quality. This transmission policy involves finding patterns correlating usage time with reception quality. For example, if a particular user routinely travels at noontime in an elevator with poor reception before exiting a building for lunch, the server may take measures to ensure continued reception quality (such as pre-caching) during this time period.

Section 216 of the dialog box 202 includes Yes/No radio buttons to enable using historical patterns of other users to predict transmission quality of the current remote device. For example, it may be the case that a geographical region is poorly served by a particular transmitter station during rush-hour traffic and the historical data of other devices bears this out. Thus, this transmission policy feature relies on the transmission data from other devices rather than from the user's remote device.

As the user adjusts the various aspects of the transmission policy at the remote device, it is saved locally within the memory of the remote device. In one embodiment of the invention, whenever a new presentation is prepared for delivery to the remote device, the presentation server requests and downloads the transmission policy from the media device, if available. In this manner, the user can specify his or her preferences once for several presentation delivery services. Alternatively, the remote device may automatically update a transmission policy record residing at one or more presentation servers every time the user amends the transmission policy.

Figure 3:
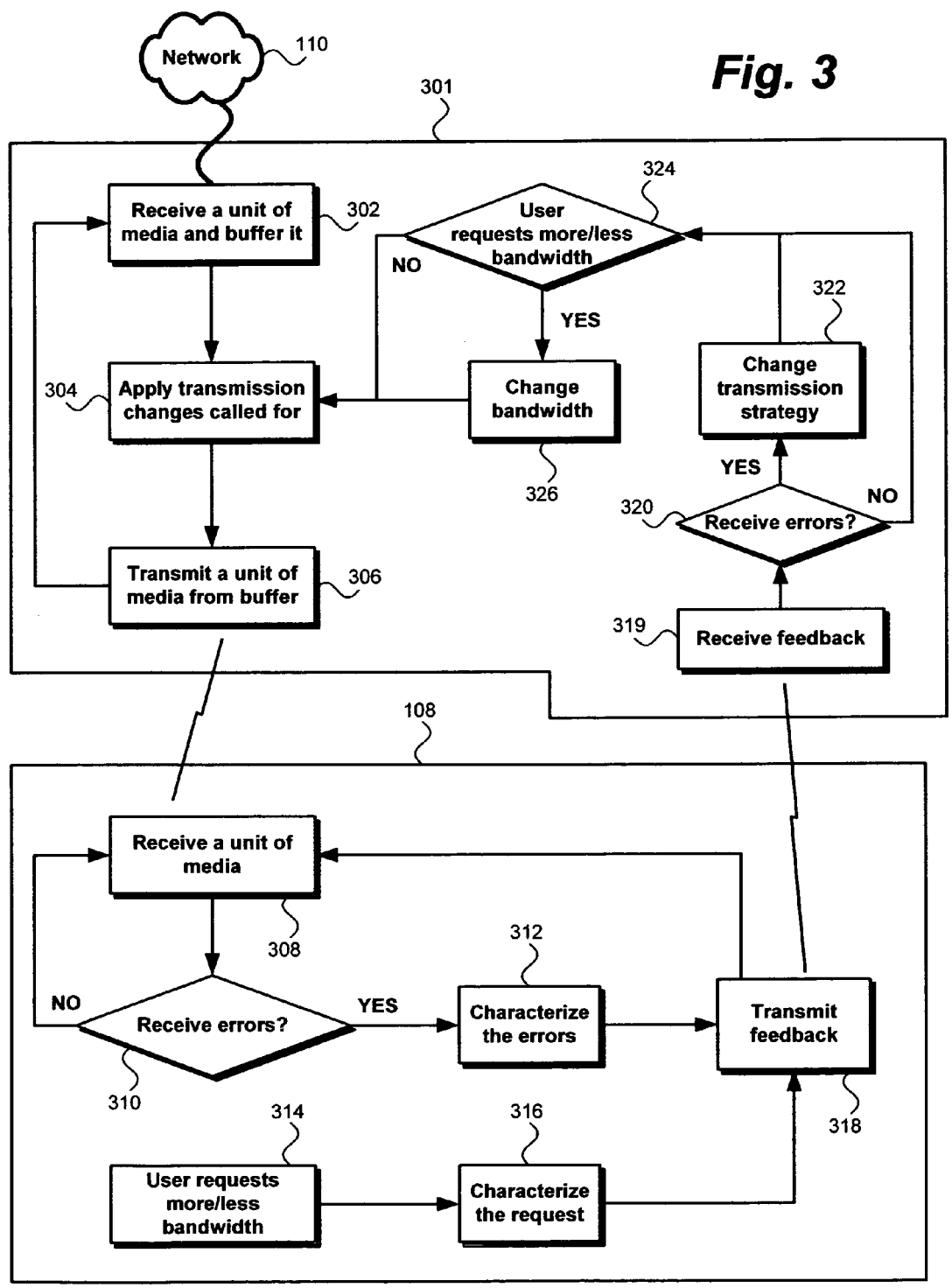
FIG. 3 shows an exemplary system contemplated by the present invention.

In FIG. 3, an exemplary transmission system 301 and remote device 108 contemplated by the present invention is shown. The transmission system 301 includes both a media server and a transmitter station. Receiving module 302 at the transmission system 301 is configured to receive a unit of media presentation from a computer network 110. The unit of media may be formatted using various encoding methods known in the art and may contain various types of media, such as text, sound and images. The media may further include identification of a remote device 108 to receive the media.

Upon receiving the media presentation, the transmission system 301 may retrieve a transmission policy record stored in memory and associated with the identified remote device. Alternatively, the transmission system 301 may retrieve a transmission policy stored at the remote device 108. After receiving the media unit, changing module 304 applies any necessary transmission strategy changes to the media unit according to the transmission policy. Once changing module 304 has performed any necessary changes, the media unit is presented to transmitting unit 306.

At transmitting unit 306, the media unit is transmitted to the remote device 108. As mentioned above, transmissions to and from the transmission system 301 and the remote device 108 may be achieved using known wireless transmission methods, such as WiFi, Bluetooth, LASER transmission and cellular transmission. Other known transmission methods may also be implemented without departing from the spirit and scope of the present invention. At the transmission system 301, control returns to receiving module 302, where the next media unit is processed. At the remote device 108, receiving module 308 receives the transmitted media unit.

Receiving module 308 captures the media unit passed by the transmitting module 306 and passes it to detecting module 310. At detecting module 310, the remote device 108 determines if the media unit contains any errors. It is contemplated that various methods for detecting errors may be employed by the present invention, such as comparing the transmitted contents to a transmitted checksum value. If detecting module 310 determines errors are present in the media unit, control passes to characterizing module 312. Characterizing module 312 identifies the detected errors and creates a description of the current transmission quality. If detecting module 310 does not detect errors in the media unit, control returns to receiving module 308, where the next transmitted media unit is ready to be received.

Adjusting module 314 checks whether the user desires more or less bandwidth for the present media presentation transmission. Adjusting module 314 may, for example, receive an event notification that a user interface widget, such as a button or slide bar, for adjusting the bandwidth has been activated. If adjusting module 314 resolves that a change in bandwidth is desired, control passes to characterizing module 316 where a description of desired bandwidth is created.

Transmission module 318 receives information from characterization modules 312 and 316. The transmission module 318 packages the collected information and returns it to the transmission system 301. At the transmission system 301, a feedback receiver 319 obtains the collected information from the remote device 108. The feedback receiver 319 forwards the information to determining module 320.

Determining module 320 checks if the remote device 108 reported any transmission errors. If so, changing module 322 is utilized to amend the current transmission strategy as required. For example, changing module 322 may increase the number of error correcting bits transmitted with the units of media. It should be noted that the transmission strategy may not require amending, even if errors were detected by the remote device 108. If no errors were perceived by the determining module 320, control moves directly to determining module 324.

Determining module 324 checks if the remote device 108 desires more or less transmission bandwidth. If bandwidth change is desired, control passes to changing module 326. Changing module 326 increases and decreases the bandwidth utilized to transmit the media presentation to the remote device. A decrease in bandwidth may help lower delivery costs of the media presentation. On the other hand, an increase in bandwidth may improve the media presentation quality at the remote device 108. The present invention beneficially gives the remote device user the power to compare the presentation delivery costs against the presentation quality. Furthermore, the user can control how much is bandwidth and other resources (and their associated expense) are allocated to the media presentation to achieve the desired presentation quality. After changing the bandwidth or transmission strategy at modules 322 or 326, control returns to changing module 304, where the changes are performed for the next media unit received by the transmission station 112. If no bandwidth change is needed, control passes from determining module 324 to changing module 304.

Figure 4:
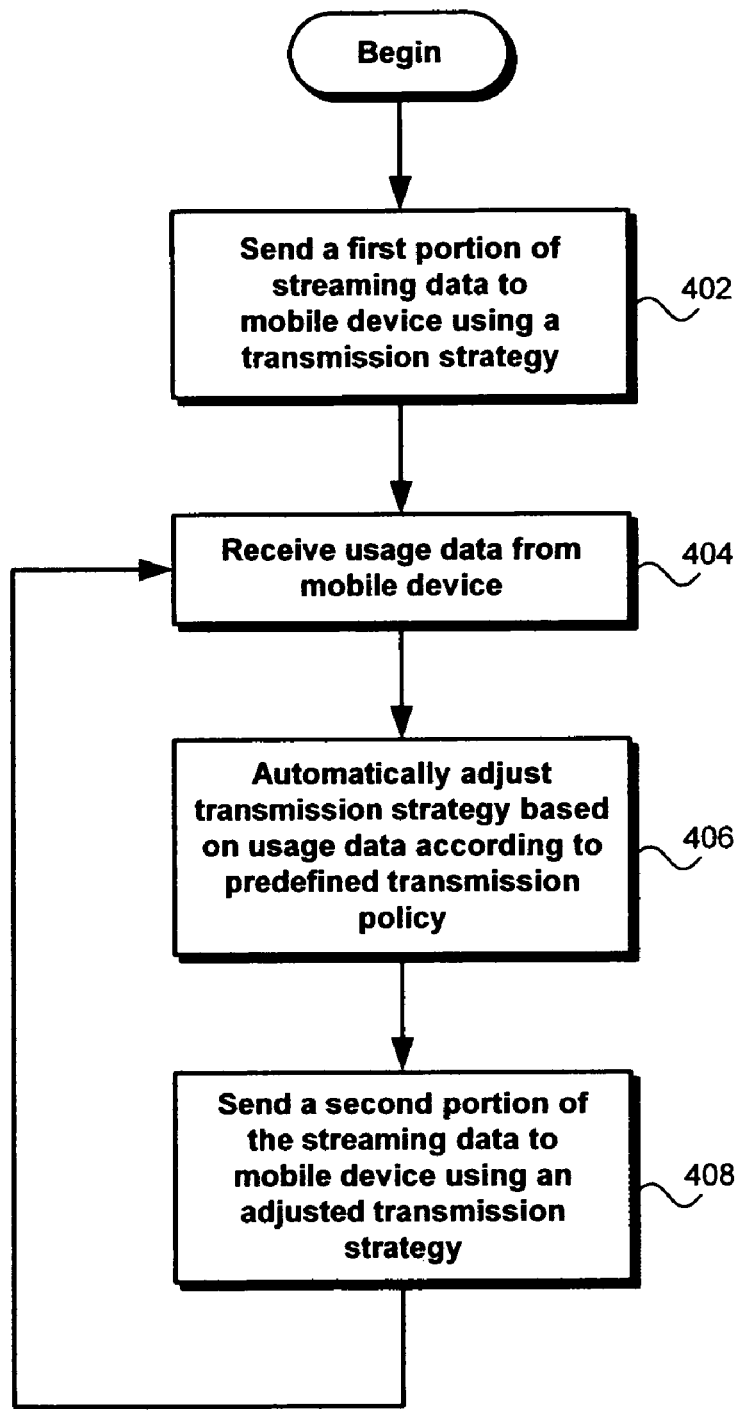
FIG. 4 shows an exemplary flowchart for delivering a streaming media presentation to a remote device from a transmitter.

In FIG. 4, an exemplary flowchart for delivering a streaming media presentation to a remote device from a transmitter is shown. It should be remarked that the logical operations shown may be implemented (1) as a sequence of computer executed steps running on a computing system and/or (2) as interconnected machine modules within the computing system. Furthermore, the operations may be performed on a virtual machine abstracted in a computer platform, such as the Java Virtual Machine (JVM) executing over a native operating system. The implementation is a matter of choice dependent on the performance requirements of the system implementing the invention. Accordingly, the logical operations making up the embodiments of the present invention described herein are referred to alternatively as operations, steps, or modules.

Operational flow begins with sending operation 402. During sending operation 402, a first portion of a media presentation is sent to a remote device using a transmission strategy. The initial transmission strategy may be a default strategy chosen by the device user. In one embodiment of the invention, the default transmission strategy is selected by means of a user interface allowing the user to specify a desired quality/price tradeoff for a particular media presentation. As discussed previously, various transmission strategies are contemplated by the present invention. Different transmission strategies may vary the data transmission rate, reshuffle the bit order of the data, and/or transmit data in bursts to the remote device. Moreover, different transmission strategies may vary how and where transmitted data is buffered. Among the buffering choices available are buffering at the transmission station, at multiple transmission stations, or at the remote device itself.

At a period of time after the first portion of media presentation is transmitted to the remote device, usage data is received from the remote device. At this point, operational control passes from sending operation 402 to receiving operation 404.

At receiving operation 404, usage data from the remote device is received. The usage data is designed to inform the media presentation server if a transmission strategy should be modified because of usage changes at the remote device. The usage data can provide feedback about the location of the remote device, time of day at the remote device, and the signal quality of the transmitted signal. By enabling the remote device to provide feedback, the following benefits can be achieved:

1. Users of the remote device can see the desired perceived quality and are therefore more inclined to use the media service, increasing revenue for content providers and advertisers alike.

2. Video programs are delivered that may otherwise not be. A video program that is delivered with such poor quality as to be unwatchable may be considered to be non-deliverable of the video program, raising a potential dispute between the user and provider.

3. Advertisements are delivered that may otherwise not be. An advertisement that is delivered with such poor quality as to be unwatchable may be considered to be non-delivery of the advertising.

4. Advertisers may be given data on which ads were actually displayed on the remote devices. Software can monitor what is displaying on the screen or played by speakers and report back whether or not the commercial was presented to the user.

5. Feeding back user desires for quality versus price tradeoff for a particular media presentation, affecting the presentation as it continues, would satisfy the user's desire for a fair price.

6. Quality verses price tradeoffs when made during the presentation relieve the user from having to guess the desired tradeoff ahead of time.

7. Information of perceived value, when collected for many users, and normalized for each viewer's habits, could be valuable to the program creators and distributors, more so than just information about which shows were ordered.

The usage data may include metrics about the transmission's error rate, signal strength, or both. Error rate could be characterized in many ways, including the percentage of bad bits detected or missed bits expected or as number per second. Further information may characterize how contiguous the errors are. For example, the information may specify whether errors occur in isolated random bits or gather in adjacent bits. Packets expected but not received could be another measure of signal quality. The usage data provided by the remote device may be delivered periodically to help establish a trend.

Feedback from the receiving device to the transmitting entity allows the transmitter to automatically adjust the current transmission strategy based on a predefined transmission policy. Thus, after receiving usage data from the remote device at receiving operation 404, control passes to adjusting operation 406.

At adjusting operation 406, the transmission strategy is automatically adjusted according to the usage data and the predefined transmission policy. As discussed earlier, some of the transmission strategy changes may include:

Changing the data transmission rate

Stretching out the transmitted information (reshuffling the bit order)

Transmitting at the same bit-per-second rate, but not continuously to bring down the cost of transmission (burst transmission with more error correcting bits)

Simultaneous transmission by more than one transmitter

Pre-buffering transmitters

Pre-buffering remote device

For example, in a common transmission, a typical error is a burst of interference (i.e., someone starts their car). Thus, typical interruptions are not tiny and random, but large and concentrated and occasional. One way to make a signal robust against this kind of interference is it to take the information in the signal and spread it out over a longer time. Bits are transmitted over a longer period of time by interleaving them with information from other frames. Thus, in a video presentation, bits from one frame are interleaved with bits from many other frames so that interference affects several frames in a small way rather than one frame in a large way. The error correction code may be able to fix the small number of errors in the many frames.

As discussed above, it is contemplated that the transmission policy is authored by the remote device user and is delivered to the transmitting entity. The transmission policy is tailored to reflect the user's preference of presentation quality and price for receiving such quality. The user may not initially know the desired price verses quality tradeoff, and may change his/her choice during a streaming presentation, depending on the user's evolving feelings of the presentation's perceived value. Thus, the feedback adjustment interface is preferably available to the user during the presentation.

The server or transmitter refers to the transmission policy and, if necessary, adjusts the current transmission strategy as directed by the policy. Thus, at sending operation 408, a second portion of the media presentation is sent to the remote device using an adjusted transmission strategy.

The process described above may repeat as the media presentation is transmitted to the remote device. Therefore, control flow can return to receiving operation 404 after sending operation 408 is completed. The frequency of iterations may be configurable by the system to filter out insignificant changes in transmission quality.

Figure 5:
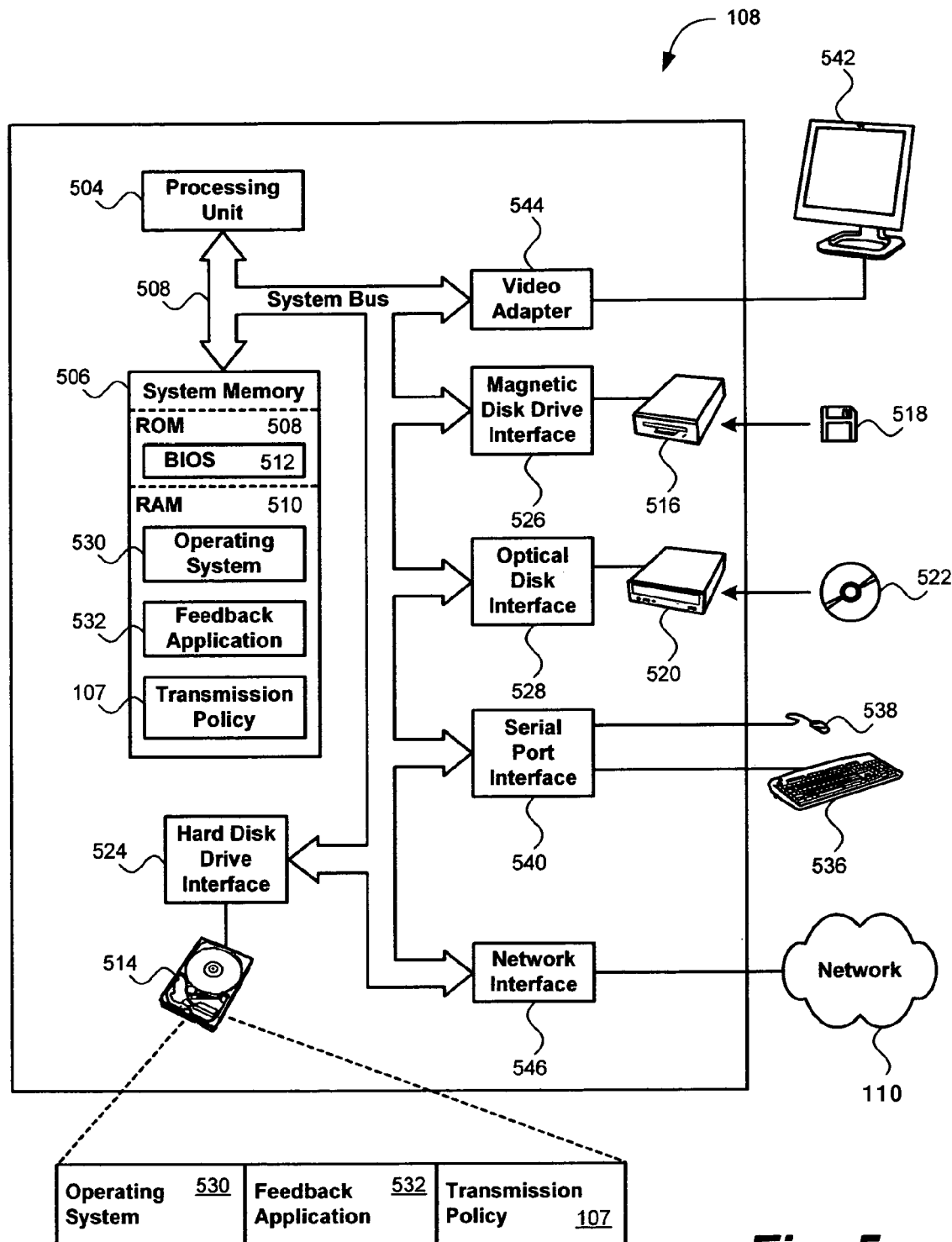
FIG. 5 shows an illustrative embodiment of a client computer embodying the present invention.

FIG. 5 shows an illustrative embodiment of a remote device 108, such as a laptop computer, embodying the present invention. The remote device 108 includes a processing unit 504, a system memory 506, and a system bus 508 that couples the system memory 506 to the processing unit 504. The system memory 506 includes read only memory (ROM) 508 and random access memory (RAM) 510. A basic input/output system (BIOS) 512, containing the basic routines that help to transfer information between elements within the remote device 108, such as during start-up, is stored in ROM 508.

The remote device 108 further includes a hard disk drive 514, a magnetic disk drive 516 (to read from and write to a removable magnetic disk 518), and an optical disk drive 520 (for reading a CD-ROM disk 522 or to read from and write to other optical media). The hard disk drive 514, magnetic disk drive 516, and optical disk drive 520 are connected to the system bus 508 by a hard disk interface 524, a magnetic disk interface 526, and an optical disk interface 528, respectively. The drives and their associated computer-readable media provide nonvolatile storage for the remote device 108. Although computer-readable media refers to a hard disk, removable magnetic media and removable optical media, it should be appreciated by those skilled in the art that other types of media that are readable by a computer, such as flash memory cards, may also be used in the illustrative remote device 108.

A number of program modules may be stored in the drives and RAM 510, including an operating system 530, a presentation feedback application 532, transmission policy 107, and other program modules (not shown). As discussed above, the remote device 108 is configured to receive presentation units and send usage data back to the presentation server. Furthermore, the remote device 108 includes a user interface that beneficially allows the user to adjust the transmission policy 107 according to the user's price and presentation quality preferences.

A user may enter commands and information into the remote device 108 through a keyboard 536 and pointing device, such as a mouse 538. Other input devices (not shown) may include a microphone, modem, joystick, game pad, satellite dish, scanner, or the like. These and other input devices are often connected to the processing unit through a serial port interface 540 that is coupled to the system bus 508.

A monitor 542 or other type of display device is also connected to the system bus 508 via an interface, such as a video adapter 544. In addition to the monitor, the remote device 108 may include other peripheral output devices (not shown), such as speakers and printers.

The remote device 108 operates in a networked environment using logical connections to one or more remote devices. The remote device may be a server, a router, a peer device or other common network node. When used in a networking environment, the remote device 108 is typically connected to the network 110 through a network interface 546. In a network environment, program modules depicted relative to the remote device 108, or portions thereof, may be stored in one or more remote memory storage devices.

The foregoing description of the invention has been presented for purposes of illustration and description. It is not intended to be exhaustive or to limit the invention to the precise form disclosed, and other modifications and variations may be possible in light of the above teachings. For example, the transmission strategy may lower the data transmission rate to the remote device when a battery charge level falls below a threshold value in order to minimize the processing power required to exhibit the presentation at the remote device. Furthermore, the transmission strategy may be based, in part, on an available memory size at the remote device.

Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A computer program product comprising computer program code for delivering streaming data to a remote device from a wireless transmitter, the computer program code comprising computer executable instructions configured for:

receiving a transmission policy from the remote device;

sending a first portion of the streaming data to the remote device using a transmission strategy;

receiving usage data from the remote device, wherein the usage data includes at least location information, time of day information about the remote device, and signal reception quality data about the first portion;

adjusting the transmission strategy based, at least in part, on the usage data according to a transmission policy, wherein adjusting the transmission strategy includes adjusting a percentage of error-correction bits transmitted along with the streaming data, redistributing and adjusting an adjacency of related bits, spreading apart the related bits, interleaving the streaming data with the related bits, adjusting an uninterrupted portion length of the streaming data sent to the remote device for later use, and pre-buffering additional transmitters proximate the remote device, the additional transmitters selected, at least in part, based on a current location, a predicted location, current usage data, and historical usage data of the remote device; and sending a second portion of the streaming data to the remote device according to the adjusted transmission strategy.

2. A computer implementable method for delivering streaming data to a remote device from a wireless transmitter, the method comprising:

sending a first portion of the streaming data to the remote device using a transmission strategy;

receiving usage data from the remote device, wherein the usage data includes signal reception quality data about the first portion;

adjusting the transmission strategy based, at least in part, on the usage data according to a transmission policy and includes pre-buffering additional transmitters proximate the remote device, wherein said pre-buffering the additional transmitters includes predicting a future transmitter based on a prior usage pattern of the remote device; and sending a second portion of the streaming data to the remote device according to the adjusted transmission strategy.

3. The method of claim 2, further comprising receiving the transmission policy from the remote device.

4. The method of claim 2, wherein the usage data includes at least location information about the remote device.

5. The method of claim 2, wherein the usage data includes at least time of day information at the remote device.

6. The method of claim 2, wherein adjusting the transmission strategy includes adjusting a percentage of error-correction bits transmitted along with the streaming data.

7. The method of claim 2, wherein adjusting the transmission strategy further includes:

redistributing and adjusting an adjacency of related bits;
spreading apart the related bits; and
interleaving the streaming data with the related bits.

8. The method of claim 2, wherein adjusting the transmission strategy includes adjusting an uninterrupted portion length of the streaming data sent to the remote device for later use.

9. A computer implementable method for delivering streaming data to a remote device from a wireless transmitter, the method comprising:

sending a first portion of the streaming data to the remote device using a transmission strategy;

receiving usage data from the remote device, wherein the usage data includes signal reception quality data about the first portion;

adjusting the transmission strategy based, at least in part, on the usage data according to a transmission policy and includes pre-buffering additional transmitters proximate the remote device, wherein said pre-buffering the additional transmitters includes predicting a future transmitter based on a prior usage pattern of other devices; and sending a second portion of the streaming data to the remote device according to the adjusted transmission strategy.

10. The method of claim 9, further comprising receiving the transmission policy from the remote device.

11. The method of claim 9, wherein the usage data includes at least location information about the remote device.

12. The method of claim 9, wherein the usage data includes at least time of day information at the remote device.

13. The method of claim 9, wherein adjusting the transmission strategy includes adjusting a percentage of error-correction bits transmitted along with the streaming data.

14. The method of claim 9, wherein adjusting the transmission strategy further includes:

redistributing and adjusting an adjacency of related bits;
spreading apart the related bits; and
interleaving the streaming data with the related bits.

15. The method of claim 9, wherein adjusting the transmission strategy includes adjusting an uninterrupted portion length of the streaming data sent to the remote device for later use.

* * * * *

UNITED STATES PATENT AND TRADEMARK OFFICE
CERTIFICATE OF CORRECTION

PATENT NO. : 7,647,037 B2  Page 1 of 1
APPLICATION NO. : 11/344059
DATED : January 12, 2010
INVENTOR(S) : Ayachitula et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this

Sixteenth Day of November, 2010

David J. Kappos
*Director of the United States Patent and Trademark Office*